United States Patent
Knox et al.

(10) Patent No.: US 6,523,391 B1
(45) Date of Patent: Feb. 25, 2003

(54) VERTICAL HEIGHT IMPACT TESTING APPARATUS

(75) Inventors: Kenneth A. Knox, Kearney, MO (US); Ronald Jay Nelson, Platte City, MO (US); Terry L. Bellmore, Kansas City, MO (US); Gregory Lee Carlock, LaFayette, GA (US)

(73) Assignee: Variform Inc., Kearney, MO (US)

( * ) Notice: Subject to any disclaimer, the term of this patent is extended or adjusted under 35 U.S.C. 154(b) by 0 days.

(21) Appl. No.: 09/877,812

(22) Filed: Jun. 8, 2001

(51) Int. Cl.⁷ ............... G01N 19/02; G01P 15/00
(52) U.S. Cl. ................... 73/12.06; 73/12.01
(58) Field of Search .............. 73/12.13, 12.06, 73/12.04, 12.01, 12.09

(56) References Cited

U.S. PATENT DOCUMENTS

| | | | | |
|---|---|---|---|---|
| 1,985,478 A | * | 12/1934 | Yuasa ..................... | 236/1 E |
| 2,890,766 A | * | 6/1959 | Sargeant .................. | 188/377 |
| 3,056,279 A | * | 10/1962 | Milewski et al. .......... | 73/12.13 |
| 3,226,974 A | * | 1/1966 | Break et al. ............. | 73/12.06 |
| 4,640,120 A | * | 2/1987 | Garritano et al. ......... | 73/12.13 |
| 5,313,825 A | * | 5/1994 | Webster et al. ........... | 73/81 |
| 5,567,867 A | * | 10/1996 | Nazar .................... | 173/90 |

\* cited by examiner

*Primary Examiner*—Benjamin R. Fuller
*Assistant Examiner*—Lilybett Martir
(74) *Attorney, Agent, or Firm*—Lathrop & Gage L.C.

(57) ABSTRACT

A vertical impact testing apparatus comprises a rigid frame, an anvil connected to the frame, a dart positioned above the anvil, and a dropped-weight mechanism slidably connected to the frame. The frame is comprised of a vertical column, a base, and a guide rail. The vertical column extends for a sufficient distance to securely support a weight assembly through travel from various heights for testing a specimen. To facilitate downward travel of the dropped-weight mechanism at a proper vertical orientation, a guide block is rigidly attached to the weight assembly and the dropped-weight mechanism is slidably mounted to the guide rail. The dart is stabilized by a braced support arm connected to the frame and a bearing acting cooperatively to ensure impact of the dart with the specimen is in the vertical plane and without tilt. The anvil is a solid structure, fixed in position, which contacts and supports the specimen on a side opposite of the dart as the dart impacts the substrate and forces it downward.

5 Claims, 2 Drawing Sheets

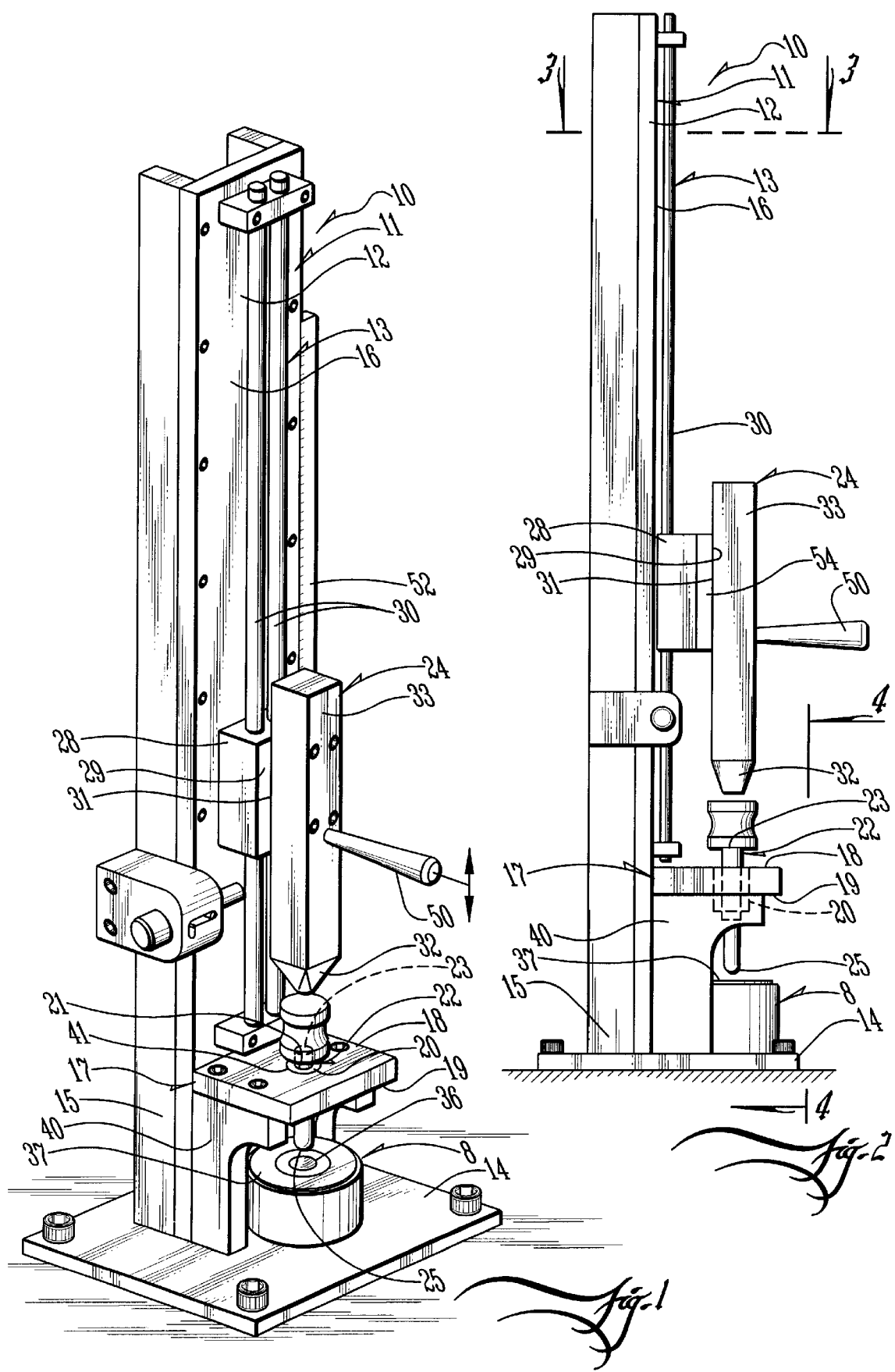

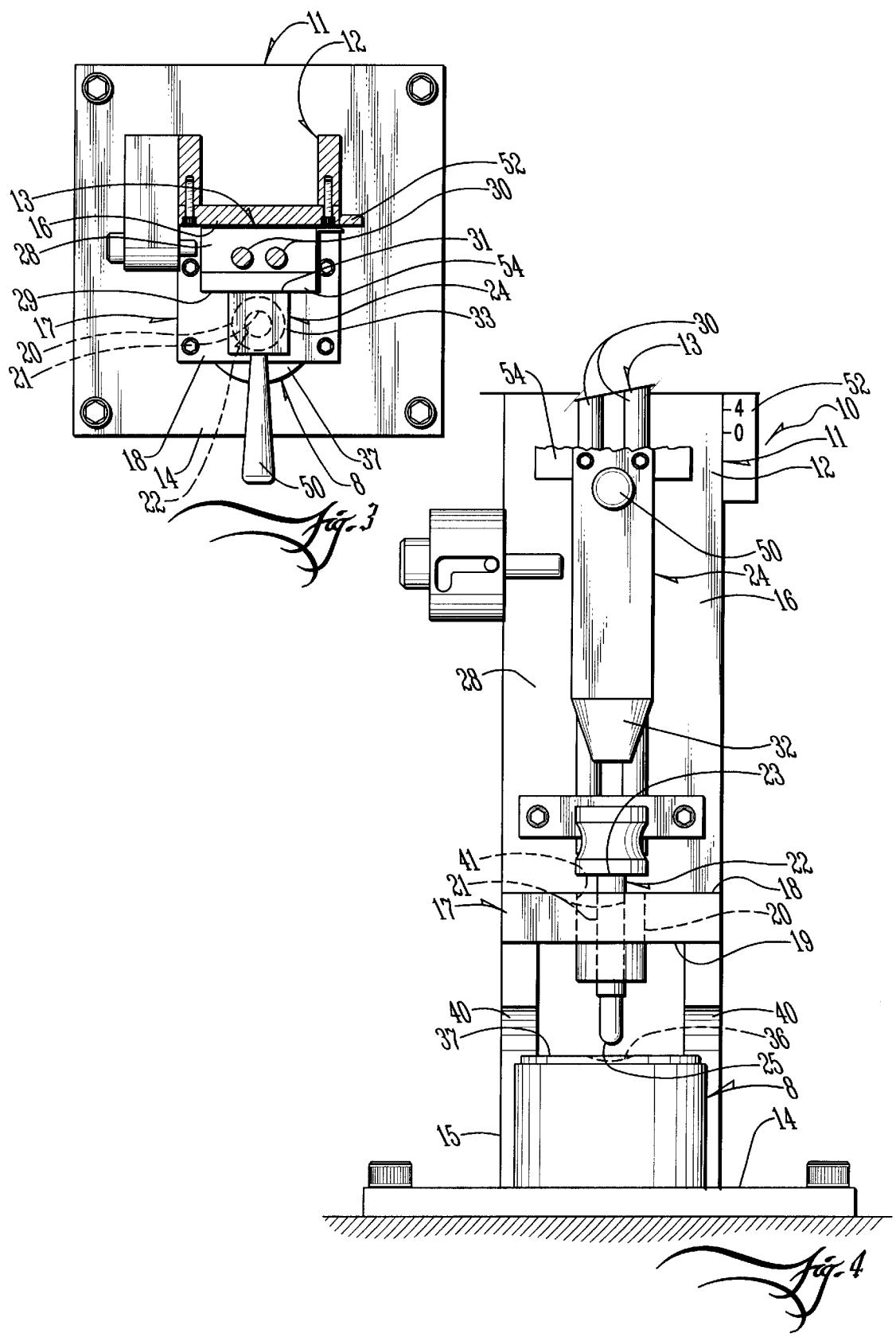

VERTICAL HEIGHT IMPACT TESTING APPARATUS

BACKGROUND OF THE INVENTION

1. Field of the Invention

This invention relates generally to equipment for measuring the impact resistance of different materials, and more particular, to a dropped-weight testing assembly for testing the failure energy of rigid materials.

2. Description of the Related Art

The use of plastic, aluminum or other sheeting materials for structural applications is increasing due to weathering, cost and weight advantages provided by these materials. The quality for a particular batch of sheeting material, however, varies and thus it is necessary to test whether a predetermined minimum impact resistance has been attained. In order to accurately determine the energy required to crack or break these rigid sheeting or flat sections used in building products, dropped-weight testing apparatus and procedures (hereinafter vertical height impact tests) have been developed. These apparatus and procedures call for the dropping of a weight, of given size and material, onto a specimen from various heights to determine the energy of a ductile-to-brittle transition for the specimen. This test has been standardized and is specifically set forth in ASTM D4226-99a, and for rigid PVC siding, ASTM 3679-99a, both of which are incorporated herein by reference.

A critical component of the vertical height impact test is the vertical alignment of the dropped-weight on the dart, impactor or tup (hereinafter "dart"), and the perpendicular direction of the force translated to the specimen by the dart. Off-center alignment will cause the specimen to be sheared and not stretched to failure. Further, non-perpendicular impact focuses the test energies into a smaller area of the test specimen at a higher value.

Present vertical heigh impact test apparatus have design configurations that exacerbate the potential inaccuracy in failure energy results for a given test material conducted under the same conditions. Premature failure of a substrate is very common due to the improper alignment of impact mechanisms. One of the sources for this premature failure is the ability of the dropped-weight assembly to travel non-linearly during free-fall. Typical vertical impact testing apparatus use a barrel to guide the dropped-weight assembly to the dart. Clearance is provided between the barrel and the dart in an attempt to reduce friction. This clearance, however, allows the dropped-weight assembly to impact the dart at a non-perpendicular angle. Further, since these apparatus are often manually operated, the clearance between the barrel and dropped-weight assembly also allows the operator to unknowingly shift the dropped-weight assembly to an off-center alignment with the dart. If the dropped-weight assembly impacts the dart in a non-centered position, the dart enters the test specimen at an angle thereby focusing the test on a smaller than expected area. This results in premature failure of the test material and an inaccurate impact resistance determination.

Another source of variation commonly encountered is the inability of the dart to remain in vertical alignment during impact by the dropped-weight assembly. This arises from the support mechanism for the dart being slightly flexible. As a result, if the weight-assembly contacts the dart at a slight off-center position, the support may flex and permit the dart to enter the test specimen at an angle. Present vertical impact test structures use a lightweight support for the dart which has the advantage of being easy to move or transport. But such structure lacks sufficient rigidity to maintain the dart in vertical alignment for the bore that guides the dart during impact.

Further variation in the test equipment performance arises from the dart failing to remain vertically aligned through travel to the test specimen. Any lateral movement or tilt of the dart with respect to the vertical axis of the bore for the dart results in inaccurate impact strength results. This displacement is a function of both the amount of clearance between the dart and the inner diameter of the anvil cavity for receiving the dart, the clearance between the dart and the support arm, and the distance from the upper edges of the anvil hole and the lower edges of the support arm.

The use of a barrel or tube as a guide also leads to inaccurate results. In this design, the dropped-weight assembly must force the air through the end of the barrel and draw air in behind the weight assembly. This results in an additional loss of energy.

Thus it is desired to have an impact resistance testing apparatus that is specifically designed to be on a defined centerline and to maintain this centerline alignment during the testing of a test specimen. This will ensure that the dart contacts the test specimen at a perpendicular angle and that impact resistance readings are more consistent and more accurate. By eliminating the lateral movement of the weight assembly and the dart upon impact, negative variation is greatly reduced and a more accurate measurement of impact resistance of a given material can be determined.

SUMMARY OF THE INVENTION

The principal objects and advantages of the present invention include: providing a testing apparatus for accurate measurement of impact resistance of a test specimen; providing such a device that reduces the amount of variation in test results when conducted on a single test specimen under the same conditions; providing such a device that is optimized for testing a variety of sheeting materials, such as PVC, other plastics, aluminum and other sheet building material; and providing such a device that is easy to use and efficient in operation.

An impact resistance testing apparatus of the present invention comprises a rigid frame, an anvil connected to the lower region of the frame upon which a specimen will be placed for testing, a dart slidably positioned above the anvil to contact the specimen, and a dropped-weight mechanism positioned above the dart to apply a vertical impact force on the dart. The rigid frame comprises a vertical column, a guide rail and base. The guide rail is connected to, and aligned with, the vertical column to facilitate proper movement of the dropped-weight mechanism. To ensure that the dart contacts the specimen at a perpendicular angle, a braced support arm is connected to the frame above the anvil and below the dropped-weight mechanism. This support arm is designed to minimize flexure to ensure that the dart remains in vertical alignment upon impact from the slide hammer. A bearing is contained within a vertically oriented bore in the support arm and surrounds the dart for a sufficient length as to minimize lateral movement during vertical displacement of the dart and contact with the substrate.

The dropped-weight mechanism comprises a guide block and a weight assembly. The guide block is rigidly mounted to the weight assembly and slidably connected to the guide rail to facilitate downward travel of the slide hammer at the proper vertical orientation and to prevent tilting of the slide hammer upon impact with the dart.

The present invention provides a testing apparatus with improved reliability in impact resistance test results by reducing or eliminating the sources of variation. By maintaining proper alignment of the weight assembly and the dart through impact and vertical displacement, the test specimen is impacted at a true perpendicular angle to eliminate premature shear failure and inherent variation in the testing apparatus. Thus, the impact resistance measurements taken are a more accurate determination of the true strength of the substrate sample.

Other advantages and components of the present invention will become apparent from the following description taken in conjunction with the accompanying drawings, which constitute a part of this specification and wherein are set forth exemplary embodiments of the present invention to illustrate various objects and features thereof.

BRIEF DESCRIPTION OF THE DRAWINGS

FIG. 1 is a perspective view of an embodiment of the present invention in its normal vertical orientation.

FIG. 2 is a side elevational view of the present invention.

FIG. 3 is a cross-sectional view of the vertical column and the guide rail taken along line 3—3 of FIG. 2 showing the interconnection of the guide rail and guide blocks.

FIG. 4 is a cross-sectional view of the anvil taken along line 4—4 of FIG. 2 showing the cavity in the surface of the anvil to allow for deflection of the substrate and the positioning of the dart concentrically within the bearing.

DETAILED DESCRIPTION OF THE INVENTION

Referring now to the drawings, a testing apparatus in accordance with the present invention is shown generally at 10. The testing apparatus 10 comprises a rigid frame 11, an anvil 8, a dart 22 positioned linearly above the anvil, and a dropped-weight mechanism positioned above the dart and mounted to the frame. The testing apparatus is thereby configured such that the slide hammer mechanism travels vertically on the rigid frame and impacts the dart to impart linear deflection of the dart to contact the test specimen.

Frame 11 comprises a vertical column 12, a guide rail 13 and a base 14, and provides structural support and guiding means for the components of the testing apparatus 10. The vertical column 12 can be made of any type of design and materials known in the art to support the dynamic forces generated by a testing apparatus, and is preferably made with steel with a longitudinal axis extending in the vertical direction. The column 12 has a lower end 15 and a face 16 for interfacing with the other testing apparatus 10 components. The guide rail 13 is rigidly attached to the vertical column 12 and extends longitudinally along face 16. Preferably, the guide rail 13 is a twin-shaft Thompson rod 30. However, any means known in the art to perform a similar guiding function may be used. The lower end 15 of column 12 is connected to base 14. Base 14 extends horizontally a sufficient distance to ensure the testing apparatus remains stable during test trials. The vertical column 12 and the base 14 are preferably pinned and bolted together to ensure vertical alignment of the testing apparatus 10 with the center hole 18 of anvil assembly. Base 14 may be constructed of any materials known in the art to provide a rigid foundation for dynamic testing equipment and is preferably a steel plate having a thickness of approximately ¾ in., and a 9 in. by 8 in. rectangular configuration.

Anvil assembly 8 is mounted to the top surface of base 14 and is positioned adjacent face 16 of vertical column 12. As shown in FIG. 4, anvil assembly 8 is configured with a cavity 36 in an upper surface 37 thereof to allow the substrate to deflect downwardly upon impact by dart 22. As with base 14, anvil assembly 8 may be constructed of materials known in the art to be sufficiently rigid to withstand the impact force transmitted by the dart 22 from weight assembly 33. Preferably, steel is used as the material. Base 14 and anvil assembly 8 can be rigidly secured to the base 14 through any means known in the art, and preferably is bolted to the base 14.

Support arm 17 houses dart 22 and has an upper surface 18, a lower surface 19, and gussets 40. As shown in FIGS. 1 and 2, support arm 17 extends outwardly from face 16 of the vertical column 12 at a point above anvil assembly 8. A vertically oriented bore 41 extends through support arm 17 and is in vertical alignment with the longitudinal centerline of slide hammer 33. The support arm 17 may be constructed of any materials known in the art to provide support to the dart 22 upon impact from the slide hammer, and is preferably a steel bar. Gussets 40 are generally vertically oriented members connected to the lower surface 19 of support arm and to the base of the apparatus 10. Gussets 40 are typically made of steel plates. The connection between the gussets 40 and the braced support arm 17 and base can be made by any means typically known in the art and are preferably pinned and bolted together. The bracing of support arm 17 ensures that dart 22 will not tilt when struck by weight assembly 33.

As shown in FIG. 3, a bearing 20 is concentrically mounted in bore 41. The bearing 20 is preferably a frelon bearing such as available from McMaster-Carr, model number 5986K5. It should be understood, however, that any bearing known in the art to provide substantially the same guiding and support function may be used. Bearing 20 is sized and configured to extend below the support arm to minimize the lateral movement of dart 22. Preferably, bearing 20 is 1.5 in. in length and extends approximately an additional 0.5 in. below the support arm.

Dart 22 is positioned and configured to fit within internal diameter 21 of bearing 20 and extends vertically below the lower surface 19 of braced support arm 17 as shown in FIG. 1. Dart 22 has an upper end 23 for receiving the impact from the weight assembly 24 and a lower end 25 for translating the impact force onto a test specimen. Dart 22 slides in bearing 20 between a first position directly above a test specimen and a second position in which its lower end is inside the cavity of the anvil. To guide the dart 22 through displacement and contact with a test specimen, the bearing 20 is selected to allow for minimal lateral movement of the dart 22. Dart 22 is preferably configured at its upper end 23 with a concave recess to facilitate the movement of the dart from its second position to its first position.

The dropped-weight mechanism 24 comprises a guide block 28 having bearings mounted thereon and a weight assembly 33. The guide block is slidably mounted to the guide rail 13 and is rigidly connected to the weight assembly 33. The dropped-weight mechanism 24, as shown in FIGS. 1 and 2, is positioned above the support arm 17 and is essentially rectangularly or cylindrically configured with an interfacing edge 31 and a lower end 32. The interfacing edge 31 is connected to the side 29 of the guide block 28. Preferably, a spacer 54 is used to position the weight assembly 33 such that the weight assembly shares the centerline defined by dart 22. The lower end 32 of the weight assembly is shaped and configured to match the upper end 23 of the dart 22 to accurately translate an impact force.

Various means are known in the art for securely guiding the weight assembly 33 vertically. The connection between the weight assembly 33 and the guide blocks 28, to form the dropped-weight mechanism 24, can be made by any means typically known in the art. Preferably, the weight assembly 33 is bolted to the guide blocks 28. The weight assembly 33 can be made from any construction or materials known in the art to be of a sufficient rigidity and weight to transmit the required impact force to a dart and preferably is constructed of steel. The weight assembly is preferably generally rectangularly shaped and has a sufficient length to provide the required weight.

The dropped-weight mechanism 26 further includes a handle 50 and a scale 52. The handle is rigidly mounted to weight assembly 33 to permit manual displacement of the dropped-weight assembly. Scale 52 is mounted to vertical column 12 to provide a scale to aid in the testing process.

To operate the testing apparatus 10 of the present invention, a test specimen is placed on top of the anvil 8 and below the lower end 25 of the dart 22. The test specimen can be aligned such that multiple tests can be done on different sections of the same sheet of material. The weight assembly 33 of a desired weight is raised vertically along the guide rail 13 to a pre-selected height shown on scale 52 to create the appropriate, pre-selected, dynamic force required for testing the impact resistance of a test specimen. Generally, a height is first chosen that will not cause a failure. The weight assembly 33 is then released and allowed to free fall under the force of gravity. Guide block 28 guides the weight assembly 33 vertically towards the dart 22. As the lower end 32 of the weight assembly 33 contacts the upper end 23 of the dart 22, the braced support arm 17 ensures that the impact energy is transmitted to the dart in the vertical plane and that no tilt or flex results. The lower end 25 of the dart 22 then contacts the test specimen. Bearing 20 ensures that the dart continues travel in the vertical plane during the entire test procedure and that the test specimen is not impacted at a non-perpendicular angle. Anvil assembly 8 supports the test specimen on a side opposite the dart 22 and allows downward deflection of the test specimen into the depression 36 when contacted by the dart 22. Dart 22 can be raised and the test specimen removed to inspect for damage or failure. The impact resistance of a test specimen is exceeded when it fails due to the presence of a punched hole, crack, split, shatter, or tear created in the target area by the force of the dart 22 pushing the test material into the cavity 36 of the anvil assembly 8. Depending on the condition of the test specimen after testing, the process can be repeated by incrementally raising the height of the weight assembly 33 and conducting another drop test until failure of the test material results.

From the forgoing information, it should now be obvious that the testing apparatus 10 provides a more accurate mechanism for determining the impact resistance of different materials. The reduction in inherent negative variation in the equipment results from a more precise means of guiding and stabilizing the weight assembly 33 and dart 22 and the adherence of the weight assembly, the dart and the anvil cavity to the vertical plane defined by the centerline of the dart to ensure that the test specimen is contacted at the proper orientation. Also, it is to be understood that the invention described herein is equally applicable to the testing of other test specimens besides sheeting materials for building structures. While certain forms of the present invention have been illustrated and described herein, it is not to be limited to the specific forms or arrangement of parts described and shown.

What is claimed:

1. A testing apparatus for measuring the impact resistance of a specimen, comprising:

(a) a substantially rigid vertical frame having a base, a vertically extending column, and a horizontally extending braced support arm mounted to the column, the support arm having a vertically extending bore;

(b) a dart slidably mounted in the bore of the support arm and being slidable between a first position and a second position, the dart having a centerline that defines a vertical axis, the dart further comprising a body with an upper end shaped and configured to receive an impact force and a lower end shaped and configured to transmit an impact force to the specimen;

(c) a dropped weight mechanism for delivering the impact force, the dropped weight mechanism positioned above the dart and slidably mounted to the frame, the dropped weight mechanism having a weight assembly centered about the vertical axis defined by the dart whereby the dropped weight mechanism travels vertically on the substantially rigid frame and impacts the dart to impart deflection of the specimen;

(d) an anvil assembly mounted to the base and having a cavity for receiving the dart as the dart is moved into said second position, the cavity being centered on said vertical axis of the dart, the anvil assembly being operably configured to hold the specimen; and (e) a linear bearing generally surrounding the dart and fitting within the vertically extending bore of the braced support arm for guiding the dart through vertical displacement after impact by the dropped weight mechanism whereby the bore of the support arm and the linear bearing are contiguous to minimize the tilt of the dart away from the vertical axis during impact by the dropped weight mechanism.

2. The testing apparatus of claim 1, wherein the braced support arm comprises an upper surface and a lower surface and extending horizontally from the frame at a position generally above the anvil and below the dropped-weight mechanism.

3. The testing apparatus of claim 2, wherein the braced support arm further comprises at least one gusset mounted to the lower surface of the braced support arm and to the base.

4. The testing apparatus of claim 2, wherein the vertical centerline of the dart is positioned to be aligned with the vertical centerline of the weight assembly of the dropped-weight mechanism.

5. The testing apparatus of claim 1, wherein the dart comprises a cylindrically shaped metal body to fit concentrically within the linear bearing.

\* \* \* \* \*